United States Patent
Uzunov et al.

(10) Patent No.: US 11,457,191 B2
(45) Date of Patent: Sep. 27, 2022

(54) COMPUTER IMPLEMENTED METHOD FOR TEMPORALLY STABILIZING WHITE POINT INFORMATION IN AN AUTO WHITE BALANCE PROCESS, A DATA PROCESSING APPARATUS, A COMPUTER PROGRAM PRODUCT, AND A COMPUTER-READABLE STORAGE MEDIUM

(71) Applicant: BEIJING XIAOMI MOBILE SOFTWARE CO., LTD., Beijing (CN)

(72) Inventors: Vladislav Uzunov, Tampere (FI); Andriy Bazhyna, Tampere (FI); Miikka Tuppurainen, Tampere (FI); Tapio Finnila, Tampere (FI); Jarno Nikkanen, Tampere (FI)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 17/369,945

(22) Filed: Jul. 7, 2021

(65) Prior Publication Data
US 2022/0094898 A1    Mar. 24, 2022

(30) Foreign Application Priority Data

Sep. 18, 2020  (EP) .................................... 20196947

(51) Int. Cl.
*H04N 9/73*        (2006.01)
*H04N 5/232*       (2006.01)
*H04N 5/235*       (2006.01)

(52) U.S. Cl.
CPC ............. *H04N 9/735* (2013.01); *H04N 5/235* (2013.01); *H04N 5/23229* (2013.01)

(58) Field of Classification Search
CPC ........ H04N 9/73; H04N 9/735; H04N 1/6077; H04N 1/6086

(Continued)

(56) References Cited

U.S. PATENT DOCUMENTS 9,838,660 B1 * 12/2017 Dinerstein ............. H04N 9/735
2012/0013764 A1 * 1/2012 Sakai ..................... H04N 9/643
                                                          382/167

(Continued)

FOREIGN PATENT DOCUMENTS

CN    108551576 B  * 12/2019    ............... H04N 9/73
CN    110602473 A    12/2019

OTHER PUBLICATIONS

Extended European Search Report in European Application No. 20196947.4, dated Feb. 9, 2021, (7p).

(Continued)

*Primary Examiner* — Anthony J Daniels
(74) *Attorney, Agent, or Firm* — Arch & Lake LLP

(57) ABSTRACT

A method, apparatus, and a non-transitory computer-readable storage medium for temporally stabilizing White Point (WP) information in an Auto White Balance (AWB) process. The method may include receiving lux level, AWB statistics, and input WP. The method also include generating a histogram of the AWB statistics. The method may also include generating, from the histogram, a confidence value for the input WP. The method may also include determining a major colour count. The method may also include determining a threshold value based on the major colour count and the lux level. The method may also include setting an update state to locked when the confidence value is below the threshold value and otherwise setting it to unlocked. The final WP information is obtained from a previous frame when the update state is locked and otherwise from the input WP information.

20 Claims, 6 Drawing Sheets

(58) Field of Classification Search
USPC .................................................... 348/223.1
See application file for complete search history.

(56) References Cited

U.S. PATENT DOCUMENTS

| | | | |
|---|---|---|---|
| 2013/0093917 | A1 | 4/2013 | Zhang et al. |
| 2015/0326842 | A1* | 11/2015 | Huai .................... H04N 5/2354 |
| | | | 348/223.1 |
| 2018/0070068 | A1 | 3/2018 | Zhao et al. |
| 2019/0045161 | A1* | 2/2019 | Krestyannikov ......... G06T 7/90 |
| 2019/0253682 | A1 | 8/2019 | Nikhara et al. |
| 2021/0105448 | A1* | 4/2021 | Nikhara .................... G06T 5/50 |

OTHER PUBLICATIONS

Niloufar Pourian, Rastislav Lukac, "Auto White Balance Stabilization in Digital Video", Electronic Imaging, vol. 2019 (9), pp. 373-1-373-5, 2019, (5p).

Jonathan Barron, Yun-Ta Tsai. "Fast Fourier Color Constancy", CVPR, pp. 6950-6958, 2017, (9p).

Jarno Nikkanen, "Color Constancy by Characterization of Illumination Chromaticity". Optical Engineering, vol. 50 (5), pp. 057204-1-14, 2011, (15p).

Edwin Land, John McCann, "Lightness and Retinex Theory", Journal of the Optical Society of America, vol. 61 (1), pp. 1-11, 1971, (12p).

Joost van de Weijer, Theo Gevers, "Color Constancy Based on the Grey-Edge Hypothesis", IEEE International Conference on Image Processing 2005, vol. 2, pp. II-722, Genova, 2005, (4p).

Rudolf Clausius, "Entropy (Information Theory)", https://en.wikipedia.org/wiki/Entropy_(information_theory), (18p).

"Convolution Theorem", https://en.wikipedia.org/wiki/Convolution_theorem, (12p).

Firas Laakom, Jenni Raitoharju, Alexandros Iosifidis, Jarno Nikkanen, Moncef Gabbouj, "Intel-Tau: A Color Constancy Dataset", arXiv:1910.10404 [eess.IV], 2019, (5p).

J. Bee Bednar, Terry Watt, "Alpha-Trimmed Means and Their Relationship to Median Filters", IEEE Transactions on Acoustics, Speech, and Signal Processing, vol. 32 (1), pp. 145-153, Feb. 1984,(9p).

Cameron Taylor, "Finite Difference Coefficients Calculator",http://web.media.mit.edu/~crtaylor/calculator.html, (1p).

* cited by examiner

COMPUTER IMPLEMENTED METHOD FOR TEMPORALLY STABILIZING WHITE POINT INFORMATION IN AN AUTO WHITE BALANCE PROCESS, A DATA PROCESSING APPARATUS, A COMPUTER PROGRAM PRODUCT, AND A COMPUTER-READABLE STORAGE MEDIUM

CROSS-REFERENCE TO RELATED APPLICATION

This application is filed based upon and claims the priority of European patent application No. EP20196947.4, filed on Sep. 18, 2020, the entire contents of which are incorporated herein by reference for all purposes.

TECHNICAL FIELD

The present disclosure relates to the field of image processing and in particular, to a methods and apparatus for temporarily stabilizing white point information.

BACKGROUND

In photography and image processing, Auto White Balance (AWB) is the process of globally adjusting the colours in an image to remove any undesired colour cast on the imaged scene shed by the illuminating light source. Auto White Balance plays a key role in camera end user experience by determining the colour image quality to a great extent. Current state-of-the-art AWB algorithms perform usually well on many scenes, but still fail in some occasions. Pointing the camera on a scene close to the fail limit of AWB can produce temporal instabilities that significantly degrade the end user experience.

A traditional approach to remedy the instabilities of an AWB algorithm is to smoothen the AWB output White Point (WP) by a temporal filter. Typically, this could be a weighted and/or trimmed average filter which acts on the WPs in the past interval of convergence time T. This has been widely used in the industry by defining tuning parameters for T depending on the capture mode (still, video, viewfinder).

The temporal AWB stabilization approach in Niloufar Pourian, Rastislav Lukac, "Auto white balance stabilization in digital video", *Electronic Imaging*, vol. 2019 (9), pp. 373-1-373-5, 2019 selects the smoothing filter convergence time T adaptively from a set of pre-tuned values. The decision on the convergence time selection is done by detection of light source and image scene changes. There is a separate value of T for each of the following scenarios: (i) scene change and no light source change, (ii) light source change and no scene change, and, (iii) simultaneous scene change and light source change. The scene and light source changes are detected through the analysis of the temporal changes of several feature signals, computed from each captured frame at the imaging sensor. The feature signals are following the Correlated Colour Temperature (CCT), colour statistics, and high-frequency image information. The CCT is computed inside the Image Signal Processing (ISP) pipeline by the AWB algorithm. The colour change information is based on frame-to-frame distance of colour statistics which are separate colour channel histograms, measured both locally and globally inside the image frame. The last clue is based on overall motion detection in a frame sequence, measured by matching extracted high-frequency features (e.g., corners and edges) in consecutive frames.

A main downside of this method is that, for all three scenarios, the approach uses only a smoothing filter to stabilize the AWB output. Now, imagine a situation, where the end user pans the camera onto a difficult scene which misleads AWB to decide on the wrong WP and the end user keeps the camera onto that scene. A smoothing filter will delay the wrong WP output for as long as the convergence time T is over. However, no matter how large T is selected, the user might decide to keep the camera longer on the difficult scene and the output stabilized WP will end up being wrong.

Moreover, the CCT value used to measure temporal colour and/or light source changes is obtained from the same ISP chain as the WP, and thus they are closely related. Hence, a wrong estimation of the WP by the AWB will result in a wrong estimation of the CCT which will mislead the conclusions about the environment changes in the AWB stabilization.

Furthermore, this approach relies on high-frequency image feature detection and matching, which is either computationally expensive or requires a designated hardware (HW).

The prior art described in Jonathan Barron, Yun-Ta Tsai. "Fast Fourier Color Constancy", CVPR, pp. 6950-6958, 2017 concerns a computationally inexpensive AWB approach and offers temporal stabilization of the AWB result as a supplement, directly derived from the AWB estimation procedure. The WP is estimated in the colour chromaticity space by a two-step procedure. On the first step the chromaticity space distribution of the image frame colour content is analysed by a convolution with a set of pre-trained convolution kernels. The kernels are learned by training on a large dataset of images, such that the convolution result reaches its peak value at the annotated ground truth WP. The second step during run-time operation fits a Gaussian-like probability density function on the convolution result and estimates the WP as the mean value of the fitted distribution. The variance of the fitted distribution is used to evaluate the quality of the peak detection, as a large variance indicates that the convolution result is less peaky and the WP is less likely to be accurate. Thus, after scale normalization, the variance is used to measure directly the confidence of the WP estimation. The supplemented temporal WP stabilization is achieved by temporal smoothing of the WP values with a Kalman-like filter. The degree of smoothing in the filter and the speed of the WP transitions are controlled by the WP confidence estimate.

The main disadvantage of this AWB stabilization is similar to the main disadvantage of the approach described in Niloufar Pourian, Rastislav Lukac, "Auto white balance stabilization in digital video", *Electronic Imaging*, vol. 2019 (9), pp. 373-1-373-5, 2019. Imagine the same situation where the end user pans the camera at a difficult scene and keeps the camera there for as long as he pleases. A difficult scene would result in a widely spread result of the convolution which will have large variance of the fit and low confidence. The low confidence will make the Kalman filter to smoothen heavily the output WP, but eventually the wrong WP will be reached sooner or later depending on how difficult the scene turns out to be.

More generally, each AWB algorithm uses different assumptions and thus has a limited range of validity. Scenes occurring near the limits of validity of the inherent AWB algorithm could produce misleading WP results. As a result, the colours in the processed image could get quite an unnatural cast. On top of that, small changes of the camera framing near the border of AWB assumptions validity could lead to different casts in the consecutive frames of a recorded video, or, as observed in the device viewfinder. This can lead to colour oscillations in the recorded video which causes negative user experience, depending mostly on the magnitude and frequency of the oscillations. Another phenomenon that degrades user experience is changing White Balance (WB) gains when the scene changes, but the illuminant remains the same. Typically, this is caused when a correct AWB result turns into erroneous result due to the scene change. While oscillation can be controlled with traditional filters (e.g., trimmed mean), the latter situation cannot be solved with such means. It is important to stabilize the frame-to-frame perceived colour cast within the captured frame sequence. Stabilizing the colour gains could be maintained by stabilizing the WP at the output of the AWB algorithm.

SUMMARY

The present disclosure relates to a computer implemented method for temporally stabilizing White Point (WP) information in an Auto White Balance (AWB) process. The present disclosure further relates to a data processing apparatus for doing the same, a computer program product comprising instructions for the same, and a computer-readable storage medium comprising instructions for the same.

According to a first aspect of the present disclosure, a method for temporally stabilizing White Point (WP) information in an Auto White Balance (AWB) process is provided. The method may include receiving lux level information, AWB statistics may include image pixel data of a frame from a sequence of frames representing a scene, and input WP information obtained from the AWB process. The method may further include generating a confidence value for the input WP information. The method may further include determining a threshold value based on a major colour count and the lux level information. The method may further include setting a binary WP update state to a locked state when the confidence value is below the threshold value and to an unlocked state when the confidence value is above the threshold value. The method may further include generating, when the binary WP update state is locked, final WP information from WP information obtained from a previous frame rom said sequence and, when the binary WP update state is unlocked, final WP information from the input WP information.

According to a second aspect of the present disclosure, a data processing apparatus is provided. The data processing apparatus may include one or more processors, a non-transitory computer-readable memory storing instructions executable by the one or more processors. The one or more processors may be configured to receive lux level information, AWB statistics including image pixel data of a frame from a sequence of frames representing a scene, and input WP information obtained from the AWB process. The one or more processors may further be configured to generate a confidence value for the input WP information. The one or more processors may further be configured to determine a threshold value based on a major colour count of the frame and the lux level information. The one or more processors may further be configured to set a binary WP update state to a locked state when the confidence value is below the threshold value and to an unlocked state when the confidence value is above the threshold value. The one or more processors may further be configured to. The one or more processors may further be configured to generate, when the binary WP update state is locked, final WP information from WP information obtained from a previous frame from said sequence and, when the binary WP update state is unlocked, final WP information from the input WP information.

According to a third aspect of the present disclosure, non-transitory computer-readable storage medium having stored therein instructions is provided. When the instructions are executed by one or more processors of the apparatus, the instructions may cause the apparatus to receive lux level information, AWB statistics including image pixel data of a frame from a sequence of frames representing a scene, and input WP information obtained from the AWB process. The instructions may also cause the one or more processors to generate a confidence value for the input WP information. The instructions may also cause the one or more processors to determine a threshold value based on a major colour count of the frame and the lux level information. The instructions may also cause the one or more processors to set a binary WP update state to a locked state when the confidence value is below the threshold value and to an unlocked state when the confidence value is above the threshold value. The instructions may also cause the one or more processors to generate, when the binary WP update state is locked, final WP information from WP information obtained from a previous frame from said sequence and, when the binary WP update state is unlocked, final WP information from the input WP information.

It will be readily appreciated that one or more of the above embodiments may be readily combined with one another.

BRIEF DESCRIPTION OF THE DRAWINGS

The disclosure will be further explained by means of the following description and the appended figures.

DETAILED DESCRIPTION

Figure 1:
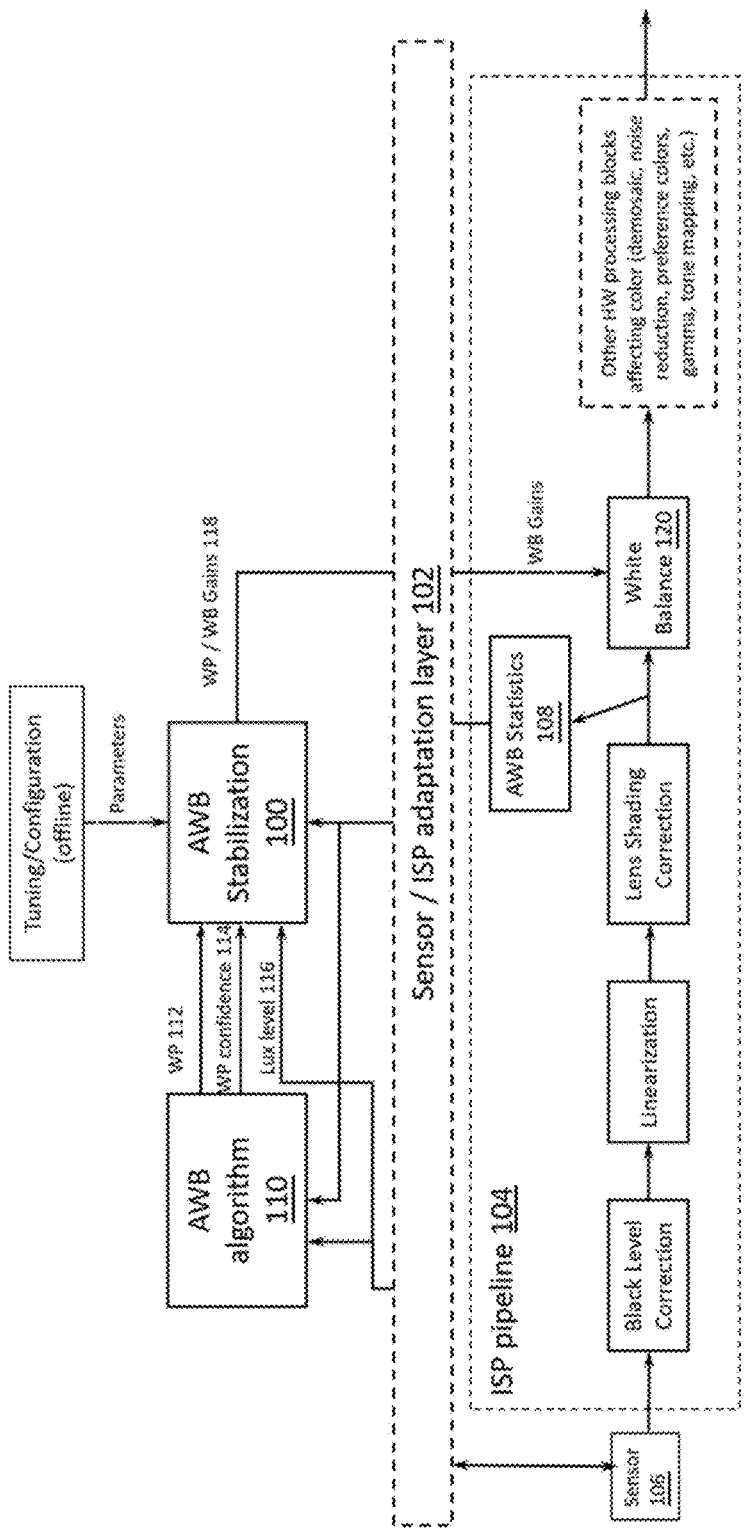
FIG. 1 shows a diagram with the location of the AWB stabilization algorithm with respect to other relevant components from the SW stack and ISP pipeline, according to an example of the present disclosure.

In the embodiments of the present disclosure, an improved method of smoothing WP information (i.e., white point or white balance gain) output from an AWB process is achieved by providing a computer implemented method for temporally stabilizing White Point, WP, information in an Auto White Balance, AWB, process. The method comprising: a) receiving lux level information, AWB statistics including image pixel data of a frame from a sequence of frames representing a scene, and input WP information obtained from the AWB process; b) generating a confidence value for the input WP information; c) determining a threshold value based on a major colour count and the lux level information; d) setting a binary WP update state to a locked state when the confidence value is below the threshold value and to an unlocked state when the confidence value is above the threshold value; and e) generating, when the binary WP update state is locked, final WP information from WP information obtained from a previous frame rom said sequence and, when the binary WP update state is unlocked, final WP information from the input WP information.

The method according to the present disclosure allows to lock or unlock the WP information. In other words, during the lock state, the WP is kept unchanged for as long as the AWB algorithm is in a difficult scene such that calculating new white point is very unreliable. Once the difficult scene has passed, the update parameter is set to unlock such that the WP may again change. The decision on locking/unlocking is based on a confidence estimate to determine when an underlying AWB algorithm is likely to fail the WP estimate.

In an embodiment of the present disclosure, step b) comprises generating a histogram of the image pixel data, the confidence value being generated from the histogram, the histogram being a two-dimensional histogram generated in log-chroma space.

Using a histogram to compute the confidence value is convenient as the histogram may be readily computed from the image pixel data meaning that no external input is required for the confidence value. The use of log-chroma space allows easier colour separation.

In an embodiment of the present disclosure, step b) comprises: determining a first confidence metric by: counting the number of histograms bins having at least two points to determine the number of essentially non-zero bins; multiplying the number of essentially non-zero bins by the bin area to determine the histogram area; and dividing the histogram area by the maximal area which is the total number of bins multiplied by the bin area to determine the first confidence metric; and determining a second confidence metric by: dividing the histogram bin count by the total number of non-saturated blocks in the AWB statistics to determine a discrete probability distribution; and calculate the entropy of the discrete probability distribution to determine the second confidence metric.

The histogram area provides an estimate of the total spread of the colours in the scene without giving importance on which colours are more dominant than others. This is a relevant WP confidence metric especially for AWB algorithms which are not influenced by the dominance of a few colours but give importance to all of them. On the other hand, the histogram entropy is useful for AWB algorithms which are prone to errors when the colour distribution is uneven, i.e., when there are dominant colours.

In an embodiment of the present disclosure, step b) comprises: determining the confidence value by calculating a weighted average of the first and second confidence metric; or determining one or more further confidence metrics, in particular a confidence metric generated by said AWB process, and determining the confidence value by calculating a weighted average of the first, the second and the one or more further confidence metrics.

Combining multiple confidence sub-metrics improves the robustness of the method such that this may be used in various known AWB algorithms.

In an embodiment of the present disclosure, step c) comprises determining the major colour count of the frame, in particular by counting the number of peaks in the histogram.

Using the histogram, in particular the log-chroma histogram, is advantageous since this has a distinct colour separation. Moreover, the major colour count (i.e., the total number of major colours in the frame) is typically temporally quite stable.

In an embodiment of the present disclosure, step c) comprises: converting the lux level information to a first probability value between 0 and 1 which preferably comprises: setting the first probability value to 0 for lux level information having a lux level below 3000 lux; setting the first probability value to 1 for lux level information having a lux level above 5000 lux; and setting the first probability value to a value between 0 and 1 by linearly mapping lux level information having a lux level between 3000 and 5000 lux; and calculating, based on the major colour count, a second probability value $D_{color}$ preferably using the following equation $$D_{color} = \frac{1}{NormLevel} \sum_{f \in frames\ in\ time\ interval}^{n} MajorColourCount_f - BaseLevel$$

where NormLevel and BaseLevel are predetermined natural numbers, MajorColourCount is the major colour count for the scene at frame f; and the time interval is a predefined time interval.

WP estimation in outdoor scenes captured in bright daylight is very reliable, because most practical AWB algorithms narrow down the possible CCT range for bright daylight. This means that the adaptive threshold could take a small value for lux levels above 5000 lux, or alternatively, the first probability value could be set to 1, indicating an easy scene. Lux levels below 3000 lux could result either from an indoor scene or an outdoor scene in cast weather and/or dim conditions, i.e., practically any light source. Consequently, the CCT range cannot be limited and the WP confidence threshold must be set high or the first probability value can be set to 0. Increasing the lux level between 3000 lux and 5000 lux the threshold should be gradually lowered, or, the first probability value should ramp from 0 to 1. Besides the lux level, also the number of colours are relevant for the WP confidence. The colour content in a scene could be measured by the number of major colours present in the scene. As this could still produce frame-to-frame jumps, the second probability value is preferably based on the trends of the colour content rather than the major colour count itself. The trend of the colour content is measured by the integrated number of colours for a predefined time interval. A base level may be chosen representing a number of major colours which indicate that the scene is not rich neither poor in colour content. The number of base level colours, integrated over the time period should produce a value of 0 in the second probability value. If, for the period the scene consisted of its minimum of only 1 major colour, then second probability value should be close to −1.

In an embodiment of the present disclosure, step c) comprises: determining a threshold driving signal by combining the first and second probability values and determining the threshold value based on the threshold driving signal; or determining one or more further probability values, in particular a probability value based on the presence or absence of a face in the scene; determining a threshold driving signal by combining the first, the second and the one or more further probability values; and determining the threshold value based on the threshold driving signal.

In this way the threshold driving signal is determined both by the lighting conditions and the colour count. This way a poor colour content would still be able to pull the threshold driving signal down when the lux level is uncertain if resulting from outdoor or indoor scene.

In an embodiment of the present disclosure, the method further comprises smoothing the input WP information using an α-trimmed mean filter to determine smoothed input WP information and preferably using the smoothed input WP information in step e).

Smoothing the WP means to follow trends of the WP change without any frame-to-frame fluctuations and jumps. Smooth trend can be followed quite efficiently by temporal averaging separately each of the WP components. Depending on the WP format, the WP components could be e.g., the R, G and B channels, chromaticity ratios R/G and B/G, etc. Unfortunately, temporal averaging can be misled by sudden jumps in the input signal. This may occur when filming a scene which is near the limits of validity of the inherent AWB algorithm. The α-trimmed mean filter temporally smoothens each component of the WP by discarding an α fraction of the smallest and largest values before the averaging to alleviate sudden jumps.

In an embodiment of the present disclosure, when the binary WP update state is unlocked, step e) comprises: e1) setting, in case the binary WP update parameter has been unlocked during a predefined number of frames of the sequence preceding said frame, final WP information equal to the input WP information or to the smoothed input WP information; or e2) generating, in case the binary WP update parameter has been changed from locked to unlocked during a frame in said predefined number of frames of the sequence preceding said frame, the final WP information as a weighted average of the input WP information or to the smoothed input WP information and the WP information obtained from said previous frame.

This allows to transition the locked WP back to the actual WP during a predefined number of frames thus avoiding a sudden jump in the WP which could occur if the locked WP and the actual WP are substantially different and the WP update parameter becomes unlocked.

In an embodiment of the present disclosure, step e2) comprises: estimating a derivative of the input WP information or to the smoothed input WP information over a further predetermined number of frames of the sequence preceding said frame; determining from the derivative, the input WP information or to the smoothed input WP information, and the WP information obtained from said previous frame if the input WP information or to the smoothed input WP information is not diverging away from the WP information obtained from said previous frame; setting, if the input WP information or to the smoothed input WP information is not diverging away from the WP information obtained from said previous frame, the final WP information equal to the WP information obtained from said previous frame; and generating, if the input WP information or to the smoothed input WP information is diverging away from the WP information obtained from said previous frame, the final WP information as a weighted average of the input WP information or to the smoothed input WP information and the WP information obtained from said previous frame.

In this embodiment, the WP derivative is analysed to identify WP trends which aid in determining the final WP information in certain situations.

In an embodiment of the present disclosure, step e2) comprises generating the final WP information as a weighted average by smoothly ramping the final WP information from the WP information obtained from said previous frame to the input WP information or to the smoothed input WP information during a predefined transition period for frames of said sequence succeeding said frame.

This allows to ramp the locked WP back to the actual WP during a predefined number of frames thus avoiding a sudden jump in the WP which could occur if the locked WP and the actual WP are substantially different and the WP update parameter becomes unlocked.

In an embodiment of the present disclosure, the WP information comprises a White Point, WP, or a White Balance, WB, gain.

This allows the method to work on both white point values or white balance values which are commonly used in AWB algorithms.

In summary, the method above allows to lock or unlock the WP information. In other words, during the lock state, the WP is kept unchanged for as long as the AWB algorithm is in a difficult scene such that calculating new white point is very unreliable. Once the difficult scene has passed, the update parameter is set to unlock such that the WP may again change. The decision on locking/unlocking is based on a confidence estimate to determine when an underlying AWB algorithm is likely to fail the WP estimate. In particular, the confidence is based on a combination of multiple confidence sub-metrics in order to be operable with any selected modern AWB algorithm.

According to the present disclosure, besides the traditionally used WP smoothing, the WP is locked whenever the AWB is unlikely to produce a correct WP estimate. Thus, a correctly locked WP is kept for as long as the scene and/or lighting conditions dictate insecurity, instead of converging to the wrong WP after a pre-tuned convergence time T is over. The AWB stabilization algorithm according to the present disclosure does not degrade the end-user experience in three aspects. The first aspect is when the AWB stabilization keeps the WP unlocked and the AWB estimates the WP correctly. A second aspect is when the AWB stabilization unnecessary locks the WP to the correct WP. The third aspect is when the AWB stabilization does not stay locked to the wrong WP long after the AWB gets back to the correct WP, in the seldom cases when AWB stabilization locks late to the wrong WP, mislead by the input AWB WP. The algorithm is independent from any underlying AWB algorithm. If, in addition, the AWB algorithm provides a reliable WP confidence estimate, it can be utilized to improve the AWB stabilization quality. Any other available WP confidence estimate, like an estimate provided by the AWB process, could be used to improve the AWB stabilization quality as well. The algorithm is able to utilize multiple different clues which indicate reliability of the estimated WP. Here the lux level is demonstrated to indicate the presence of daylight in an outdoor scene. Other clues, like human face presence, could be similarly used, in case they prove to have meaningful relation to AWB WP estimation accuracy. The adaptive threshold values can be tuned to achieve more or less aggressive AWB stabilization behaviour with higher or lower likelihood of WP locking. The algorithm has a light computational and memory track which make it attractive for a software or firmware implementation. The stabilization does not rely on dedicated hardware demanding power-hungry pixel processing, like e.g., motion estimation. The algorithm is simple for software integration as it does not demand time consuming tuning procedures and has minimal intra-component dependencies.

The present disclosure will be described with respect to particular embodiments and with reference to certain drawings but the disclosure is not limited thereto but only by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice of the disclosure.

Furthermore, the terms first, second, third and the like in the description and in the claims, are used for distinguishing between similar elements and not necessarily for describing a sequential or chronological order. The terms are interchangeable under appropriate circumstances and the embodiments of the disclosure can operate in other sequences than described or illustrated herein.

Moreover, the terms top, bottom, over, under and the like in the description and the claims are used for descriptive purposes. The terms so used are interchangeable under appropriate circumstances and the embodiments of the disclosure described herein can operate in other orientations than described or illustrated herein.

Furthermore, the various embodiments, although referred to as "preferred" are to be construed as example manners in which the disclosure may be implemented rather than as limiting the scope of the disclosure.

FIG. 1 shows a diagram with the location of the AWB stabilization algorithm 100 with respect to other relevant components from the software (SW) stack 102 and the Image Signal Processor (ISP) pipeline 104.

A sensor (e.g., a camera) 106 provides the input for the SW layer 102 and the ISP pipeline 104. The ISP pipeline 104 prepares the AWB statistics 108. The AWB statistics for the AWB stabilization algorithm 100 have precisely the same requirements as any advanced AWB algorithm. That is, the image pixel data used to prepare the local R, G and B channel averages or sums must be corrected for black level, linearity, and lens shading. Otherwise, the distribution of the data points in chroma/log-chroma space will show colour information which is not existent in the captured scene and/or the distribution may be otherwise distorted. This could mislead both AWB and the AWB stabilization algorithm. The AWB stabilization assumes that the AWB statistics format defined for the AWB algorithm can be applied also for the AWB stabilization algorithm and the same SW architecture can be reused.

There is a connection between the AWB algorithm 110 and the AWB stabilization 100. In particular, the AWB results need to be fed to the AWB stabilization algorithm 100. More specifically, the AWB WP 112 is sent together with the AWB WP confidence 114 if that is available.

The AWB stabilization 100 also requires lux level input 116. This is provided by the camera sensor SW adaptation layer 102. The lux level input 116 may be obtained either from a measurement or an estimate based on the average image brightness and camera sensor settings for exposure, analog gain, and sensitivity. Most of the advanced AWB algorithms utilize such lux level estimate and hence some sensor adaptation SW layer most likely has it already available. The same lux level value must be fed also to the AWB stabilization algorithm.

The AWB stabilization result, i.e., the WP information 118 (white point or White Balance, WB, gain) needs to be fed to the white balance block 120 in the ISP pipeline 104, instead of the AWB result coming from the AWB algorithm 110. An example conversion between the WP and WB gain is found in Jarno Nikkanen. "Color constancy by characterization of illumination chromaticity". *Optical Engineering*, vol. 50 (5), pp. 057204-1-14, 2011 and may be done in the SW layer 102.

In terms of overall synchronization, the AWB stabilization algorithm must be fed with the same AWB statistics which were used to produce its input WP by the AWB stabilization. The AWB stabilization according to the present disclosure is a computationally inexpensive algorithm and should not introduce significant delays on top of the ones that are already present in the system such that there are no synchronization issues.

Figure 2:
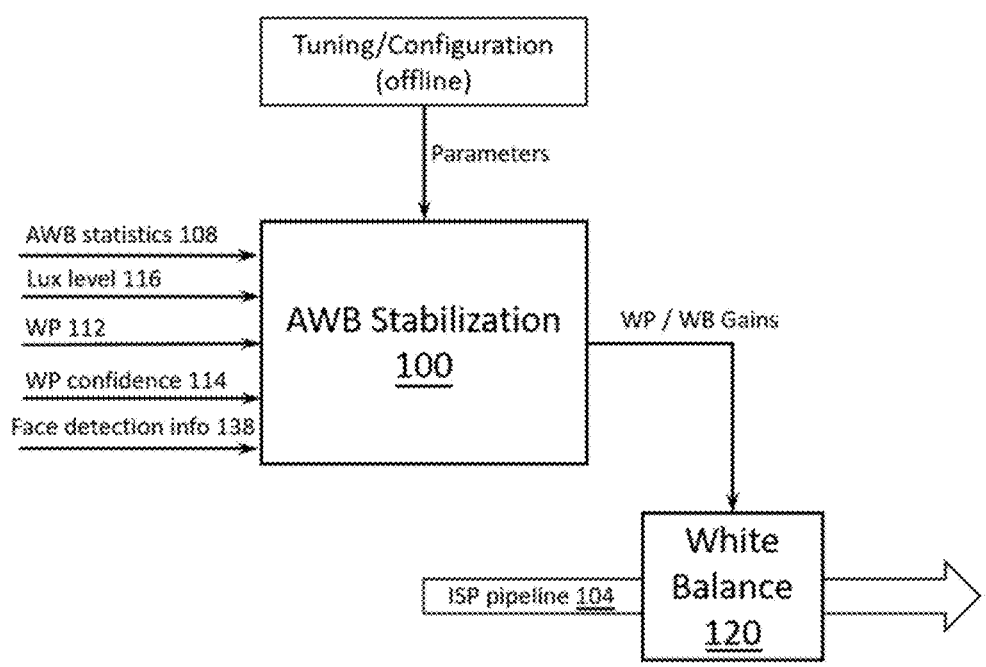
FIG. 2 shows a diagram of the AWB stabilization algorithm, according to an example of the present disclosure.
Figure 3:
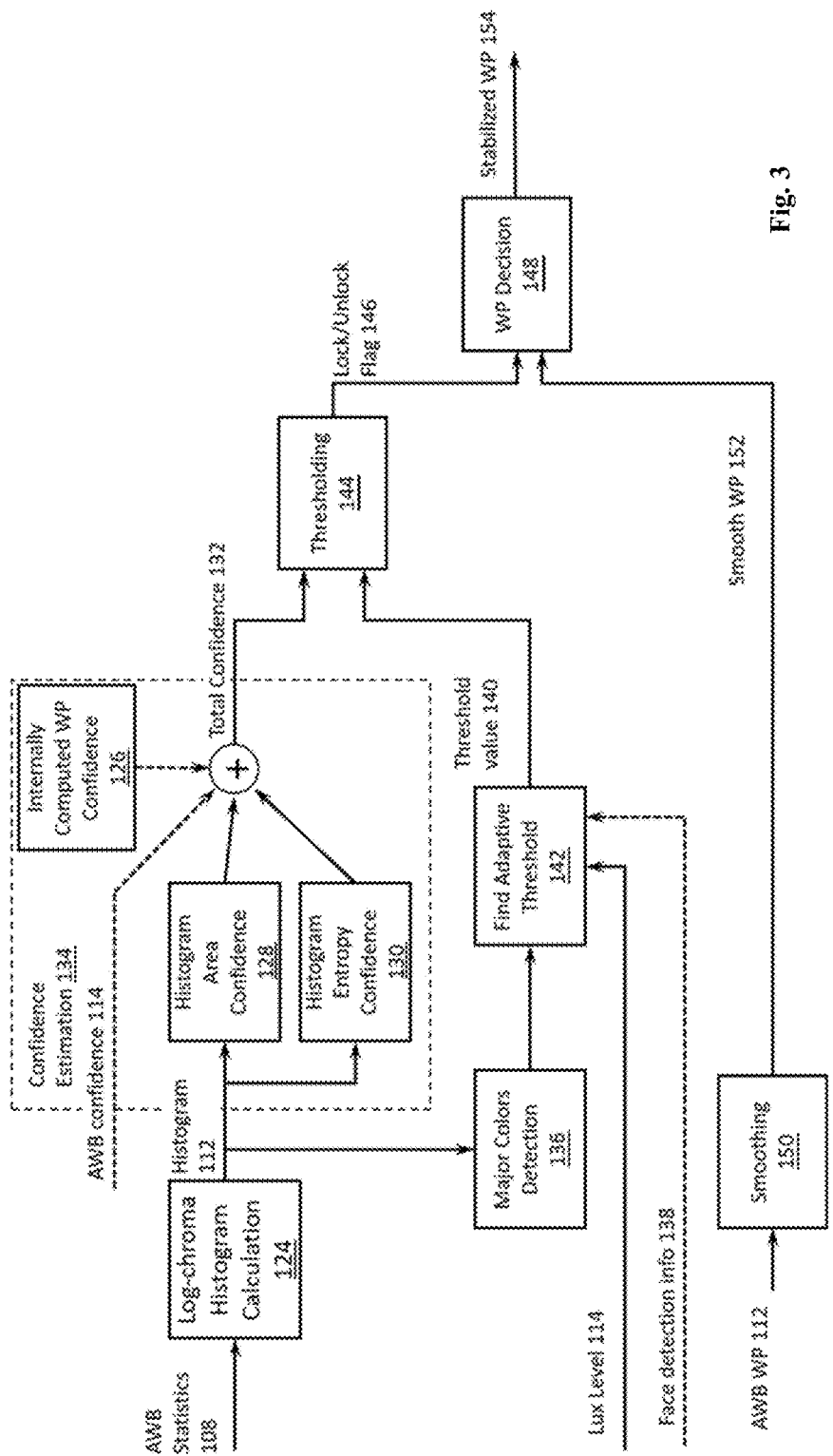
FIG. 3 shows a diagram of the AWB stabilization algorithm, according to an example of the present disclosure.

FIG. 2 illustrates the inputs and outputs of the AWB stabilization algorithm 100. A first input is the AWB statistics 108 which is also fed into the AWB process 110. The AWB statistics 108 are local sums or averages of n×n image pixels. The AWB statistics are used to build a histogram in log-chroma domain which is needed to analyse the colour content of the current frame in multiple ways. Larger statistic block size n improves the estimated colour accuracy as it filters out noise. However, a larger block is more likely to contain an edge between two differently coloured objects and pixel averaging inside the block leads to generating artificial "transitional" colours that do not exist in the scene. Hence, larger block size n would make the overall portion of transitional colours larger.

The stabilization algorithm 100 expects to get a WP estimate (i.e., the input WP) from a conventional AWB algorithm 110. The output of the AWB algorithm 110 does not need to be smoothened nor filtered. Ideally, the AWB Stabilization 100 should be the only component responsible for smoothing the WB gains. The accuracy of the AWB WP determines to a great extent also the accuracy of the AWB stabilization algorithm. If AWB is incorrect to begin with, it cannot be fixed by the AWB stabilization 100.

Lux level correlates well with all modern AWB algorithms' performance. The lux level 116 is used to determine if the scene is imaged during daylight where the confidence in the WP estimate could be greater, due to possibly narrower CCT search range. Also, significant lux level change indicates a light source change which leads to unlocking the WP. Lux can be also used to detect an Ultra-Low Light (ULL) scene where the AWB stabilization could be disabled. Ideally, this is the average lux level measured at the imaged scene. Since an accurate measurement HW is not available for mobile imaging, a computed estimate is also enough. An example method for lux level estimation from the scene can be found in Jarno Nikkanen. "Color constancy by characterization of illumination chromaticity". *Optical Engineering*, vol. 50 (5), pp. 057204-1-14, 2011.

Some AWB algorithms 110 can produce a confidence metric for the estimated WP. The AWB stabilization algorithm 100 does not necessary require a WP confidence estimate, however, if available and relatively accurate, it will improve the algorithm performance.

The AWB stabilization 100 may also optionally be provided with face detection information 138. Some AWB algorithms 110 improve by a big factor the accuracy of the WP with the help of the skin tone information, coming from a detected human face in the captured image. Hence, the trust in the WP estimate 112 can be increased by a certain amount only if the AWB algorithm 110 is known to be very reliable in the presence of a face.

Besides the list of standard inputs, the AWB stabilization algorithm 100 requires a set of fixed and a set of tuning/configuration parameters 120. The tuneable parameters define whether the algorithm locks easier and more frequently to the last reliable WP, or it gives higher trust to the AWB algorithm and lock the WP rather occasionally. The tuning parameters are related mostly to the analysis of the scene colour content and WP reliability. Another set of parameters are related to the sensor configuration like the frame rate and resolution of the incoming AWB statistics.

The output format of AWB stabilization 100 is the same as the output of the AWB algorithm 110 itself, for example WB gains or a WP in terms of WB gain ratios, and it depends on the already existing SW/HW architecture.

The AWB stabilization method 100 will be described in more detail by reference to FIG. 4. From a top-level view, the AWB statistics 108 are used to build a histogram 122 in log-chroma space by a histogram calculation module 124. Two WP confidence metrics (i.e., histogram area confidence 128 and histogram entropy confidence 130 are derived from the histogram 122 and these may be combined with externally available and internally computed AWB confidence metrics. Some or all available metrics are used to create a total confidence 132 by the confidence estimation block 134. The histogram is also used to evaluate the (recent history of the) scene colour content in a colour detection block 136. It is used by a threshold generation block 142 together with the lux level estimate 116 to determine a value 140 for thresholding the total confidence 132 within a tuneable range. Optional face detection information may also be used the by the threshold generation block 142. The total confidence 132 is passed through an adaptive threshold 144 to raise a flag 146 when the WP should lock/unlock to the current smoothened WP. The AWB WP is ideally also smoothed by a smoothing block 150 to provide a smoothed WP 152. Depending on the flag 146 and on the recent trend of the smoothened WP, the WP decision block 148 decides whether to output the smooth WP, the last locked value of the WP, or a weighted average between the smooth and locked WP. When the above process results into lock/unlock state change, the transitions between the locked WP and the smoothened WP happen in a smart gradual manner, avoiding any jumps of the final stabilized WP 154. Various blocks of the AWB stabilization method 100 will be described in greater detail below.

Usually, the AWB statistics 108 comprise local sums and/or averages of the frame pixel data in each block of n×n pixels for each R, Gr, Gb and B color channels. The top row of FIG. 4 shows a video frame (left) and its AWB statistics (right). The values in the local sums/averages are heavily dependent on the frame brightness, i.e., on the sensor exposure and gain settings. A simple way to remove the dependency on the image brightness is to take the ratios of $$\frac{R}{G} \text{ and } \frac{B}{G},$$

where G=0.5(Gr+Gb). The bottom left part of FIG. 4 shows the 2D histogram of the AWB statistics in the chroma space (R/G, B/G). The histogram has been formed by counting the amount of (R/G, B/G) points from the AWB statistics 108 falling within each bin from a set of pre-defined bins. Each (R/G, B/G) point is obtained from each AWB statistics grid block, excluding only the grid blocks which contain saturated pixels. Note that differently coloured objects like the plastic bag, the T-shirt, the jacket and the floor, peak quite closely to each other when their (R/G,B/G) values are below 1. This makes the separation between these colours quite difficult which complicates the colour content assessment. Decreasing the histogram bin size might show a better separation, however that makes the frame-to-frame histogram binning less stable and increases the total bin count, i.e., the computational load. This problem can be fixed using the logarithmic function, known to expand the separation of values smaller than 1. Therefore, the AWB stabilization algorithm 100 uses the log-chroma space $$\left(\log\!\left(\frac{R}{G}\right),\ \log\!\left(\frac{B}{G}\right)\right) = (\log(R) - \log(G),\ \log(B) - \log(G)).$$

Figure 4:
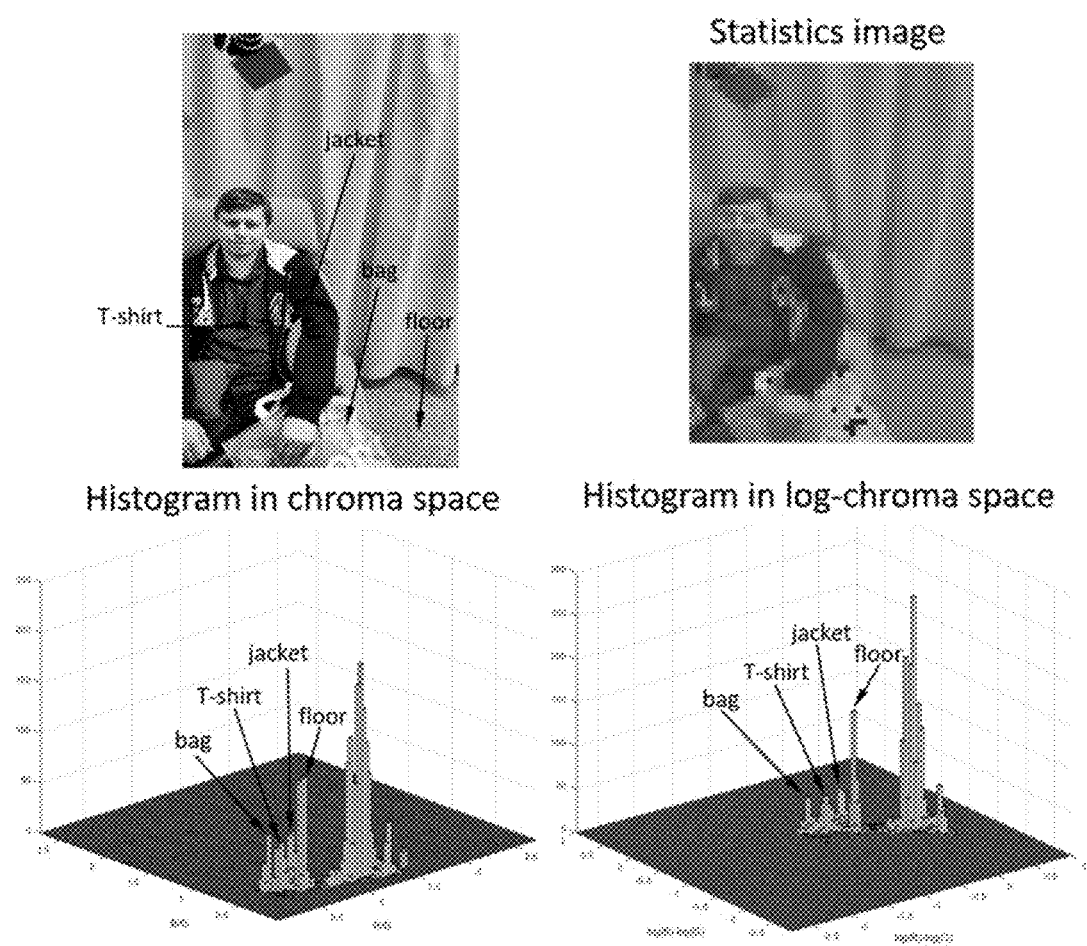
FIG. 4 shows an example of a video frame (top left), its AWB statistics (top right) with saturated blocks marked in red, AWB statistics histogram in chroma space (R/G, B/G) (bottom left) and AWB statistics histogram in log-chroma space ($\log(R)-\log(G)$, $\log(B)-\log(G)$) (bottom right), according to an example of the present disclosure.

The bottom right part of FIG. 4 shows the histogram in the log-chroma space, where one can see clear separation between the colors of the bag, the T-shirt, the jacket and the floor. This log-chroma space histogram is built in the same way as the chroma histogram. Each AWB statistics grid block is used to calculate a point by taking (log(R)-log(G), log(B)-log(G)) and all points were binned into a pre-defined set of bins.

Note that both histograms have the same overall resolution of the colour space, that is, they have the same count of histogram bins on virtually the same range. The range limits in the log-chroma space are obtained by taking the logarithm of the range limits in the chroma space. The range and the bin count of the histograms depend on the range of the AWB statistics 108, i.e., on the camera sensor and ISP settings. The choice of the bin count is made such that it provides sufficiently high resolution to allow separation between close colours and any small frame-to-frame changes in captured frame sequences do not create instabilities in the histogram.

The total confidence metric 132 is a weighted average of some or all possible WP confidence metrics available. The weights of the average should be positive and their sum should ideally be 1. A possible AWB stabilization algorithm 100 uses equal weights for all WP confidence metrics. However, note that if one metric is significantly more reliable than the others, then disproportional metrics' weights could be preferred, but the total sum of the weights should ideally remain 1. In such case, a large amount of experiments shall confirm that one metric is more reliable than the rest of the metrics by a good margin and in most practical situations that matter.

The log-chroma histogram 112 has been used when implementing the two basic WP confidence metrics 128, 130. The histogram 122 shows the actual colour content of a captured frame and its distribution in log-chroma space. For example, according to the Grey-World (GW) hypothesis (for more information, see Edwin Land, John McCann, "Lightness and Retinex Theory", *Journal of the Optical Society of America*, vol. 61 (1), pp. 1-11, 1971) a light source estimation is more reliable if wider variety of colours are constituting the scene. Many modern practical AWB algorithms are based on the grey search approach described in Jarno Nikkanen. "Color constancy by characterization of illumination chromaticity". *Optical Engineering*, vol. 50 (5), pp. 057204-1-14, 2011, which gives higher weight to points under the characterization white map. This kind of phenomena, related to the distribution of the scene colours in the chroma space, or, equivalently in log-chroma space, can be measured by analysis of the histogram.

A first confidence metric is the log-chroma histogram area 128. This is the area under the histogram bins which are essentially non-zero. Essentially non-zero bins are these, whose bin count is larger than 2 points per bin, so that transition colours and noise are not misleading the amount significant bins. The amount of essentially non-zero bins is then multiplied by the area of a single bin and divided by the maximal possible area. The maximal possible area is the area of the range where the histogram is constructed. This area may be further multiplied by a small factor for normalization, which depends on the current statistics configuration. The histogram area provides an estimate of the total spread of the colours in the scene without giving importance on which colours are more dominant than others. This is a relevant WP confidence metric especially for AWB algorithms 110 which are not influenced by the dominance of a few colours but give importance to all of them, e.g., the grey edge hypothesis described in Joost van de Weijer, Theo Gevers, "Color constancy based on the Grey-edge hypothesis", *IEEE International Conference on Image Processing* 2005, vol. 2, pp. 11-722, Genova, 2005.

A second confidence metric is the log-chroma histogram entropy 130. A WP confidence metric is also needed for AWB algorithms 110 which are prone to errors when the colour distribution is uneven, i.e., when there are dominant colours. If the histogram bin count is divided by the total number of non-saturated blocks in the AWB statistics grid, then the histogram gets the meaning of a discrete probability distribution. Taking the entropy of this distribution leads to another WP confidence metric:

$$C_e = -\frac{\sum_{i=1}^{N^2} h_i \log h_i}{2 \log N}$$

Here $h_i$ is the normalized bin count for the $i^{th}$ histogram bin and the histogram size is N×N bins. The division by the normalization factor $2 \log N$ ensures that the entropy confidence stays within the interval [0, 1].

Ideally, the minimum of used metrics in AWB stabilization should be the histogram area in combination with the log-chroma histogram entropy. However, other confidence metrics may be used. It will be readily appreciated that any of the following additional confidence metrics is purely examples and should not be construed as limiting the scope of protection of the appended claims.

One such confidence metric may be an internally computed AWB confidence 126. In particular, most computationally inexpensive and reliable WP metrics could be used internally in the AWB confidence.

Another such confidence metric may be the AWB algorithm confidence 114. In case the AWB algorithm 110 provides such a confidence metric, it is highly recommended to use this information since accuracy of the AWB algorithm 110 confidence has significant impact to AWB stabilization parameter tuning and metric weighting.

Besides WP confidence metrics 128, 130, the log-chroma histogram 112 is used to extract and separate the major colours in a scene. This information is used to determine a current value of an adaptive threshold 140 for the total confidence 132 which determines the lock/unlock of the WP. Major colours in the captured scene are large spatial areas of the same chromaticity values, or equivalently, large areas with quite similar values in the AWB statistics grid. Thus, major colours form peaks in a chroma/log-chroma space histogram. In an embodiment, the major colours in a scene are determined by detecting large and well separable peaks in the log-chroma histogram. Moreover, the detected histogram peaks should be well separable, because a pair of close by peaks could indicate different shades on the same object, or, two different objects of similar colour. In either case this could change from one frame to another significantly which would create unnatural uncertainty of the colour content in a scene.

In an embodiment, the peaks are detected by a running a 5×5 moving window through the histogram bins. A peak is detected if the bin count of the centre bin of the 5×5 window has larger bin count than all other bins falling inside the window. A peak is not detected unless the cumulative bin count of all bins exceeds certain minimum amount of chromaticity points falling within the limits of the 5×5 window of bins. This thresholding aims to ignore small peaks resulting from vanishing objects, object reflections, object shading, transitions between objects and other type of distortions. This minimum amount of chromaticity points is dependent on the resolution of the AWB statistics grid. For larger resolution, the number needs to be increased proportionally, since there will be more chromaticity points per square area of the input image and thus more chromaticity points will take part in the transitional phenomena which lead to instabilities. Moreover, a 5×5 moving window ensures a minimum peak-to-peak distance of 3 bin sizes.

Furthermore, this method for major colour detection is computationally inexpensive. The typical size for the log-chroma histogram size of N=100 would result in total of N×N=100×100=10000 histogram bins. However, the count of non-zero bins is usually much smaller than 10000, usually of the order of hundreds, depending on the colour content of the scene. Hence, an efficient implementation of the major colour detection keeps track on the locations of the non-zero bins for each frame and traces only these when sliding the 5×5 window through the histogram.

Below is a pseudocode describing the major colour detection algorithm of an embodiment of the present disclosure.

Find a list L of indices (i,j) such that the histogram bin count $h_{i,j}$ on location (i,j) is nonzero:
L = {(i,j) : $h_{i,j}$ > 0}
For each index (i,j) in the list L:
    Place a 5x5 sliding window around the location (i,j) to get all histogram bins falling inside the window:
    $h_{k,l}$, k = i−2,i−1,i,i+1,i+2 and l = j−2,j−1,j,j+1,j+2
    Get the cumulative bin count S by summing all histogram bins inside the 5x5 window:
    S = sum($h_{k,l}$), k = i−2,i−1,i,i+1,i+2 and l = j−2,j−1,j,j+1,j+2
    If S > MinPointCountPerPeakRegion
        If the center histogram bin count $h_{i,j}$ is larger than all other bin counts from the window:
        $h_{i,j}$ > $h_{k,l}$ for k = i−2,i−1,i,i+1,i+2 and l = j−2,j−1,j,j+1,j+2
            Update the list of histogram peak locations:
            P = {P;(i,j)}
        End
    End
End
Return the list of peak indices P The AWB stabilization algorithm 100 gets a signal for locking and unlocking the WP, based on thresholding the total WP confidence 132. The confidence metric sometimes goes wrong, since it is a result of an estimation process itself. For example, a difficult scene consisting of a single colour might give a high WP confidence if most chromaticity points fall within some grey search region. However, this does not mean that the object is necessary achromatic and both WP confidence and WP estimation could be fooled by the scene. In such cases it is better to elevate the threshold level for the lock/unlock decision. There are other cases where the scene is captured in bright daylight and/or the variety of colours is large and almost any AWB algorithm will succeed, even though for some reason the confidence is incorrectly estimated to be low. In such cases it is better to lower the threshold for the lock/unlock decision.

In an embodiment, the threshold is determined based on a threshold driving signal. This driving signal incorporates all available and known clues for the reliability of the scene. The used clues in are the lux level 116 and the (short history of the) scene colour variety 136.

Figure 5:
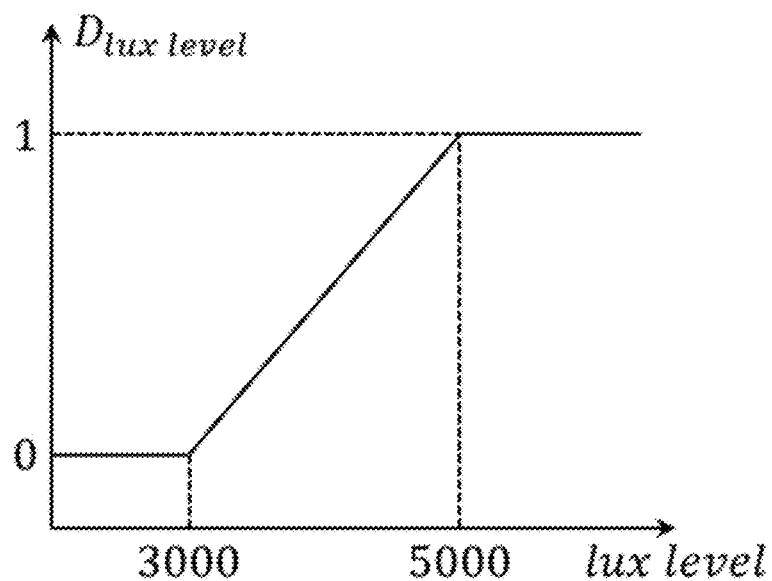
FIG. 5 shows input-output mapping between the lux level and the threshold driving signal based on the lux level, according to an example of the present disclosure.

WP estimation in outdoor scenes captured in bright daylight is very reliable, because most practical AWB algorithms 110 narrow down the possible CCT range for bright daylight. This means that the adaptive threshold could take a small value for lux levels above 5000 lux, or alternatively, its driving signal could be set to 1, indicating an easy scene. The available lux level is a result of an estimate rather than a measurement and thus not very accurate. Lux levels below 3000 lux could result either from an indoor scene or an outdoor scene in cast weather/dim conditions, i.e., practically any light source. Consequently, the CCT range cannot be limited and the WP confidence threshold must be set high or its driving signal can be set to 0. Increasing the lux level between 3000 lux and 5000 lux the threshold should be gradually lowered, or, its driving signal should ramp from 0 to 1. This behaviour is illustrated in FIG. 5.

The threshold driving signal is determined to a greater extent by the scene the colour variety, rather than by the lux level. Therefore, it makes sense to define the colour content driving signal in the range [−1, 1] rather than in the range [0, 1]. This way a poor colour content would still be able to pull the threshold driving signal down when the lux level is uncertain if resulting from outdoor or indoor scene.

The colour content in a scene could be measured by the number of major colours present in the scene. As this could still produce frame-to-frame jumps, the driving signal is ideally based on the trends of the colour content rather than the major colour count itself. The trend of the colour content is measured by the integrated number of colours for the past 1 second in time. In an embodiment, a base level of 4 major colours is chosen which indicate that the scene is not rich neither poor in colour content. Hence, these 4 colours, integrated over the past 1 second produce a value of 0 in the threshold driving signal. If, for the past 1 second the scene consisted of its minimum of only 1 major colour, then the driving signal value should be close to −1. If the scene contained more than BaseLevel=4 colors on the average for the past second, then the driving signal could grow without an upper bound and thus always mask low light conditions. This is practically achieved through the following equation $$D_{color} = \frac{1}{NormLevel} \sum_{f \in frames\ in\ time\ interval}^{n} MajorColourCount_f - BaseLevel$$

The normalization factor of NormLevel=100 is chosen such that the minimum of one colour for 30 frames in the past 1 second could result in a value close to −1. Note that upon a frame rate change, the normalization level parameter NormLevel needs to be reset accordingly.

Figure 6:
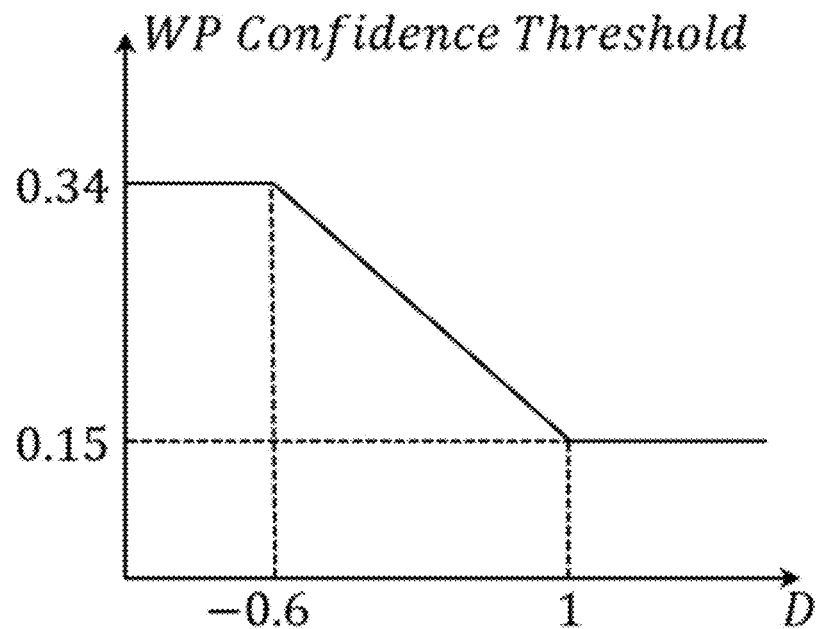
FIG. 6 shows input-output mapping between the threshold driving signal and the threshold values, according to an example of the present disclosure.

The final threshold driving signal is a sum of the colour content and lux level components $D=D_{color}+D_{lux\ level}$. This driving signal D is used to set the threshold smoothly within the desired limits with the mapping depicted in FIG. 6. That is, a driving signal level lower than −0.6 indicates that the scene is not to be trusted, neither by the colour count, nor by the lux level and the WP confidence threshold should be set at its maximum level. Values of D higher than 1 mean that either the colour content of the scene is rich, or, the lux level corresponds to a bright outdoor scene, or both, and the threshold is lowered to its minimum value. Every other value of D between −0.6 and 1 is linearly mapped to a value between the threshold minimum and maximum values of the threshold. The minimum and maximum values of the mapping depend on the WP confidence and are set based on a large set of experiments. Hence, changing the formation of the total WP confidence and/or the threshold driving signal requires repeating the experiments.

Smoothing the WP means to follow trends of the WP change without any frame-to-frame fluctuations and jumps. Smooth trend can be followed quite efficiently by temporal averaging separately each of the WP components. Depending on the WP format, the WP components could be e.g., the R, G and B channels, chromaticity ratios R/G and B/G, etc. Unfortunately, temporal averaging can be misled by sudden jumps in the input signal. In an embodiment an α-trimmed mean filter (J. Bee Bednar, Terry Watt, "Alpha-trimmed means and their relationship to median filters", *IEEE Transactions on Acoustics, Speech, and Signal Processing*, vol. 32 (1), pp. 145-153, February 1984) is used to smoothen temporally each component of the WP, which discards an α fraction of the smallest and largest values before the averaging. This means that for each WP component, a buffer is formed of all WP component values from the past 1 second and 11% of these values— 5.5% smallest values and 5.5% largest values—are discarded. The remaining 89% of the WP component values are averaged to get the smooth WP component value for the current frame. The 5.5% of the buffered WP component values could result in a fractional number depending on the Frames Per Second (FPS) rate. Then this number is rounded to the nearest integer, i.e., round(FPS*5.5/100) largest and round(FPS*5.5/100) smallest values are discarded before the averaging. The value of 5.5% is chose such that at least one largest and one smallest value is discarded from each WP component buffer, even for a minimum rate of 10-15 FPS with some fluctuation in the frame rate and/or occasional frame drops.

When a camera is pointed to a difficult scene for the AWB algorithm 110, the WP values move to the wrong direction. No matter how advanced the smoothing filter is, the smooth WP 152 will sooner or later converge to the wrong direction. Instead of simply smoothing, the present disclosure locks the WP 154 before the smoothing filter 150 starts convergence towards the wrong WP and releases the WP 154 when the scene becomes reliable again.

When the scene is reliable and the AWB 110 is confident about it, the output stabilized WP 154 is following the smooth WP 152. At each frame, the total WP confidence 132 is compared to the adaptive threshold 140. Once the confidence 132 falls below the threshold value 140, a flag 146 is raised to indicate that the WP shall be locked. This means that the output stabilized WP 154 is not anymore following the values of the smooth WP 152, but keeps outputting the same value until a decision for unlocking has been taken.

The decision for unlocking depends on the actual situation of the smooth WP 152. Once the confidence 132 goes back above the threshold 140, a flag 146 is raised that the output stabilized WP 154 is ready for unlocking. If also the smooth WP 152 and the last output WP are nearly equal, then the output WP 154 starts following the smooth WP again. However, this is rarely the case and when the smooth and output WPs 152, 154 are not close to each other, switching the output WP directly to the smooth WP will result in a jump in the WP value. A jump in the WP leads to a jump in the colour cast which is quite poor user experience. Therefore, in such a case, the output WP 154 is ramped smoothly towards the smooth WP 152 for a transition period of 1 second. This happens frame-by-frame within the transition period, where for each frame f, the output WP is a convex combination (i.e., a weighted average) between the smooth WP and the output WP for the past frame f-1. The weights of the convex combination depend on how long ago the flag for unlocking the WP has been raised:

$$StableWP_f = \gamma \cdot SmoothWP_f + (1-\gamma) \cdot StableWP_{f-1}, \gamma = (TimeStamp(f) - UnlockFlagTimeStamp)/1(1 \text{ second}).$$

Besides the smooth transition from the locked WP to the smooth WP 152, there is yet another problematic scenario. Imagine that the scene light conditions remain unchanged and the user pans slowly away from the problematic scene. Imagine further that the time for panning happens slowly enough so that the smooth WP would converge back to the correct WP of the illuminant for a longer time than the transition period of 1 second. In this case the output WP will be moving in the wrong direction towards the smooth WP and, after the transition is over, the output WP will move back together with the smooth WP towards the true WP of the illuminant. This bump in the values of the output WP will be perceived as an unnecessarily wrong colour cast change in the image frame sequence, even though the change happens smoothly. Therefore, in situations where the user pans away from a difficult scene and the WP unlock flag is raised, the output WP could remain the same, "softly locked", for as long as the smooth WP is moving towards the locked value of the output WP. In cases when the smooth WP value starts moving away from the current value of the output WP, the smooth transition of 1 second can be used. In this case the transition will start when the smooth WP and the output WP are as close as possible to each other. This whole procedure is referred to as come-back WP expectation method.

The trend of the smooth WP can be monitored by analysing its derivative. Small values of the derivative correspond to small temporal fluctuations of the smooth WP or to a very slow trend. In any of these cases, a transition towards the smooth WP is preferable. The derivative is estimated from the last few frame values of the smooth WP by temporal linear filtering via standard convolution with a causal filter:

$$Derivative(f) = \sum_{k=0}^{K} SmoothWP_{f-k} Derivativefilter(k)$$

In an embodiment, a 5-tap (K=4) derivative filter formed by a finite difference approximation of the first derivative, based on truncated Taylor series expansion is used. If the AWB stabilization 100 has been (re-)started recently and the smooth WP has fewer than 5 samples, then a shorter derivative approximation is used. The impulse responses of the filters may be:

DerivativeFilter=[25,−48,36,−16,3]/12, for $K=4$,

DerivativeFilter=[11,−18,9,−2]/6, for $K=3$,

DerivativeFilter=[3,−4,1]/2, for $K=2$,

DerivativeFilter=[1,−1], for $K=1$.

The output WP decision algorithm 148 is illustrated with the pseudocode below.

```
Calculate the smooth WP derivative Derivative(f) for the current frame f
by convolution with the derivative filter.
If Derivative(f) < 0.0001
    Set Derivative(f) = 0
End
If Total Confidence > Threshold
    For each WP component c = R,G and B do:
        If SmoothWP_{c,f-1} == StableWP_{c,f-1}
            Follow the smooth WP: set StableWP_{c,f} = SmoothWP_{c,f}
        ElseIf smooth WP converges towards the stable output WP:
            (Derivative(f) > 0 AND SmoothWP_{c,f-1} ≤ StableWP_{c,f-1})
            OR (Derivative(f) < 0 AND SmoothWP_{c,f-1} ≥ StableWP_{c,f-1})
            Keep soft lock with come-back expectation:
            set StableWP_{c,f} = StableWP_{c,f-1}
            Update UnlockFlagTimeStamp to the current frame
            timestamp
        Else
            Start smooth transition:
            set γ = (TimeStamp(f) − UnlockFlagTimeStamp) / (1
            second)
            set StableWP_{c,f} = γ.SmoothWP_{c,f} + (1 − γ).StableWP_{c,f-1}
        End
    End
Else
    Stay locked: set StableWP_f = StableWP_{f-1}
    Update UnlockFlagTimeStamp to the current frame timestamp
End
Return the stabilized output WP for the current frame StableWP_f
```

Note that after the unlock flag 146 is raised, one component of the smooth WP 152 may converge towards the respective component of the output WP, while another component may diverge. Hence, it is best to implement the decisions for the come-back expectation and the smooth transition separately for each WP component. Otherwise, e.g., if the decision for the smooth transition is triggered by the first WP component which starts to diverge, then the remaining components of the output WP will go back and forth in the wrong WP direction. This will result in an unnecessary bump.

It will be readily appreciated that the various parameters and time periods mentioned above (e.g., NormLevel, BaseLevel, is time period, weights, etc.) may be set to different values and/or may be determined by testing the method on various data sets. Moreover, these values may also be different for different AWB processes.

Figure 7:
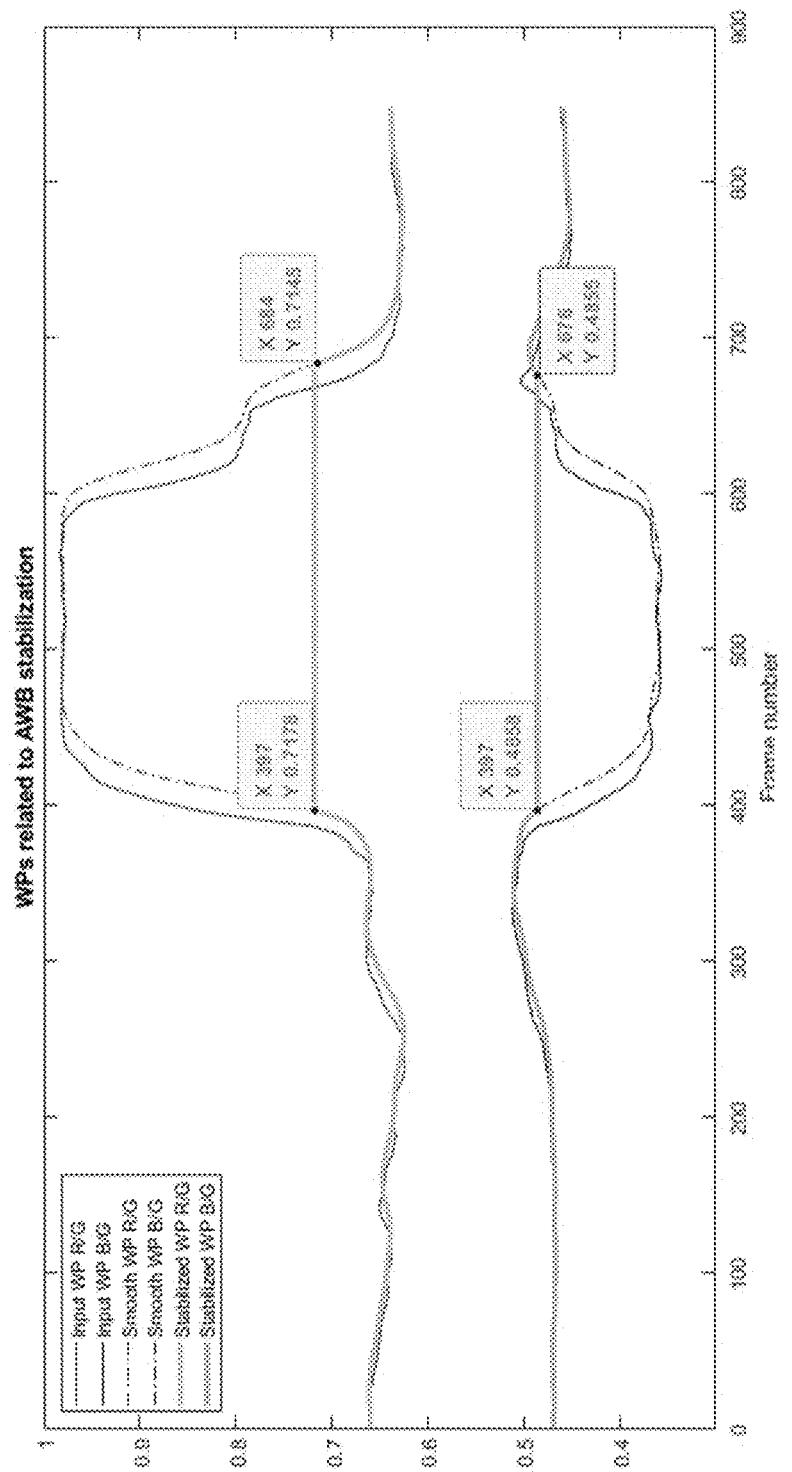
FIG. 7 shows a test scenario where the AWB result persistently fails with an input AWB WP, its smoothened and stabilized versions, according to an example of the present disclosure.

FIG. 7 illustrates a test result of the above described method and system for temporally stabilizing WP information in an AWB process. A typical test is running offline the AWB stabilization algorithm 100 on a sequence of image frames, captured by a mobile phone in a real-world test scenario. The data relevant for each frame are the AWB statistics, the AWB WP, the lux level estimate, a map with the indices of the AWB statistics grid blocks which contain saturated pixels and time stamps which correspond to the time of the AWB execution. The test device is based on a mobile platform including both ISP statistics pipeline and an integrated AWB algorithm.

FIG. 7 presents a test frame sequence, recorded while shooting a video of a scenario where the integrated AWB persistently fails. The scenario happens in office environment conditions, where a person sits on a chair in front of a single-coloured orange curtain as a background. At first, the camera is pointed from far away, the camera Field of View (FoV) includes many objects of various colours and the WP is estimated correctly. Next, the camera comes closer to the person focusing on the face, the WP starts slight motion in a wrong direction, and then the camera quickly pans away from the face onto the orange curtain, where the estimated WP is completely wrong. At the end, the camera pans back to the person's face and continues moving further back to get a colour rich scene inside the FoV. As a consequence, the estimated WP moves from the wrongly estimated WP of the curtain back to the correct value. This behaviour is depicted in FIG. 7 with thin red and blue lines for the WP's R/G and B/G ratios, respectively. The dashed lines represent the smoothened version of integrated AWB WP by an α-trimmed mean filter. The thick lines represent the output stabilized WP with labels placed on the locations of WP lock and WP unlock. Note that the R/G channel and the B/G channels unlock the WP at different frame numbers as per the component-wise come-back expectation method described earlier.

Although aspects of the present disclosure have been described with respect to specific embodiments, it will be readily appreciated that these aspects may be implemented in other forms within the scope of the disclosure as defined by the claims.

What is claimed is:

1. A method for temporally stabilizing White Point (WP) information in an Auto White Balance (AWB) process, the method comprising:
   receiving lux level information, AWB statistics comprising image pixel data of a frame from a sequence of frames representing a scene, and input WP information obtained from the AWB process;
   generating a confidence value for the input WP information;
   determining a threshold value based on a major colour count of the frame and the lux level information;
   setting a binary WP update state to a locked state when the confidence value is below the threshold value and to an unlocked state when the confidence value is above the threshold value; and
   generating, when the binary WP update state is locked, final WP information from WP information obtained from a previous frame from said sequence and, when the binary WP update state is unlocked, generating final WP information from the input WP information.

2. The method according to claim 1, wherein generating the confidence value for the input WP information comprises:
   generating a histogram of the image pixel data, wherein the confidence value is generated from the histogram, wherein the histogram is a two-dimensional histogram generated in log-chroma space.

3. The method according to claim 2, wherein generating the confidence value for the input WP information comprises:
   determining a first confidence metric by:
      counting the number of histograms bins having at least two points to determine the number of essentially non-zero bins;
      multiplying the number of essentially non-zero bins by a bin area to determine a histogram area; and
      dividing the histogram area by a maximal area, wherein the maximal area comprises the total number of histogram bins multiplied by the bin area to determine the first confidence metric; and
   determining a second confidence metric by:
      dividing the histogram bin count by the total number of non-saturated blocks in the AWB statistics to determine a discrete probability distribution; and
      calculate entropy of the discrete probability distribution to determine the second confidence metric.

4. The method according to claim 3, wherein generating the confidence value for the input WP information comprises:
   determining the confidence value by calculating a weighted average of the first and second confidence metric; or
   determining one or more further confidence metrics, wherein the one or more further confidence metrics comprises a confidence metric generated by said AWB process, and determining the confidence value by calculating a weighted average of the first, the second and the one or more further confidence metrics.

5. The method according to claim 1, wherein determining the threshold value based on the major colour count of the frame and the lux level information comprises:
   determining the major colour count of the frame by counting the number of peaks in a histogram generated from the image pixel data.

6. The method according to claim 1, wherein determining the threshold value based on the major colour count of the frame and the lux level information comprises:
   converting the lux level information to a first probability value between 0 and 1 by:
      setting the first probability value to 0 for lux level information having a lux level below 3000 lux;
      setting the first probability value to 1 for lux level information having a lux level above 5000 lux; and
      setting the first probability value to a value between 0 and 1 by linearly mapping lux level information having a lux level between 3000 and 5000 lux; and
   calculating, based on the major colour count, a second probability value $D_{color}$ using the following equation:

$$D_{color} = \frac{1}{NormLevel} \sum_{f \in frames\ in\ time\ interval}^{n} MajorColourCount_f - BaseLevel,$$

wherein NormLevel and BaseLevel are predetermined natural numbers, MajorColourCount is the major colour count for the scene at frame f, and the time interval is a predefined time interval.

7. The method according to claim 6, wherein determining the threshold value based on the major colour count of the frame and the lux level information comprises:
   determining a threshold driving signal by combining the first and second probability values and determining the threshold value based on the threshold driving signal; or
   determining one or more further probability values, wherein the one or more further probability values comprises a probability value based on presence or absence of a face in the scene, determining a threshold driving signal by combining the first, the second and the one or more further probability values, and determining the threshold value based on the threshold driving signal.

8. The method according to claim 1, wherein the method further comprises:
   smoothing the input WP information using an α-trimmed mean filter to determine smoothed input WP information and using the smoothed input WP information to generate the final WP information.

9. The method according to claim 1, wherein generating, when the binary WP update state is locked, final WP information from WP information comprises:
setting, in case the binary WP update parameter has been unlocked during a predefined number of frames of the sequence preceding said frame, final WP information equal to the input WP information or to smoothed input WP information; or
generating, in case the binary WP update parameter has been changed from locked to unlocked during a frame in said predefined number of frames of the sequence preceding said frame, the final WP information as a weighted average of the input WP information or of the smoothed input WP information and the WP information obtained from said previous frame.

10. The method according to claim 9, wherein generating, in case the binary WP update parameter has been changed from locked to unlocked during a frame in said predefined number of frames of the sequence preceding said frame, the final WP information comprises:
estimating a derivative of the input WP information or of the smoothed input WP information over a further predetermined number of frames of the sequence preceding said frame;
determining from the derivative, the input WP information or to the smoothed input WP information, and the WP information obtained from said previous frame if the input WP information or the smoothed input WP information is not diverging away from the WP information obtained from said previous frame;
setting, if the input WP information or the smoothed input WP information is not diverging away from the WP information obtained from said previous frame, the final WP information equal to the WP information obtained from said previous frame; and
generating, if the input WP information or the smoothed input WP information is diverging away from the WP information obtained from said previous frame, the final WP information as a weighted average of the input WP information or of the smoothed input WP information and the WP information obtained from said previous frame.

11. The method according to claim 9, wherein generating, in case the binary WP update parameter has been changed from locked to unlocked during a frame in said predefined number of frames of the sequence preceding said frame, the final WP information comprises:
generating the final WP information as a weighted average by smoothly ramping the final WP information from the WP information obtained from said previous frame to the input WP information or to the smoothed input WP information during a predefined transition period for frames of said sequence succeeding said frame.

12. The method according to claim 1, wherein the WP information comprises a WP or a White Balance (WB) gain.

13. A data processing apparatus, comprising:
one or more processors; and
a non-transitory computer-readable storage medium storing instructions executable by the one or more processors, wherein when the one or more processors are configured to:
receive lux level information, AWB statistics comprising image pixel data of a frame from a sequence of frames representing a scene, and input WP information obtained from the AWB process;
generate a confidence value for the input WP information;
determine a threshold value based on a major colour count of the frame and the lux level information;
set a binary WP update state to a locked state when the confidence value is below the threshold value and to an unlocked state when the confidence value is above the threshold value; and
generate, when the binary WP update state is locked, final WP information from WP information obtained from a previous frame from said sequence and, when the binary WP update state is unlocked, generate final WP information from the input WP information.

14. The data processing apparatus according to claim 13, wherein the one or more processors are further configured to:
generate a histogram of the image pixel data, wherein the confidence value is generated from the histogram, wherein the histogram is a two-dimensional histogram generated in log-chroma space.

15. The data processing apparatus according to claim 14, wherein the one or more processors are further configured to:
determine a first confidence metric by:
counting the number of histograms bins having at least two points to determine the number of essentially non-zero bins;
multiplying the number of essentially non-zero bins by a bin area to determine a histogram area; and
dividing the histogram area by a maximal area, wherein the maximal area comprises the total number of histogram bins multiplied by the bin area to determine the first confidence metric; and
determine a second confidence metric by:
dividing the histogram bin count by the total number of non-saturated blocks in the AWB statistics to determine a discrete probability distribution; and
calculate entropy of the discrete probability distribution to determine the second confidence metric.

16. The data processing apparatus according to claim 15, wherein the one or more processors are further configured to:
determine the confidence value by calculating a weighted average of the first and second confidence metric; or
determine one or more further confidence metrics, wherein the one or more further confidence metrics comprises a confidence metric generated by said AWB process, and determine the confidence value by calculating a weighted average of the first, the second and the one or more further confidence metrics.

17. The data processing apparatus according to claim 13, wherein the one or more processors are further configured to:
determine the major colour count of the frame by counting the number of peaks in a histogram generated from the image pixel data.

18. The data processing apparatus according to claim 13, wherein the one or more processors are further configured to:
convert the lux level information to a first probability value between 0 and 1 which comprises:
setting the first probability value to 0 for lux level information having a lux level below 3000 lux;
setting the first probability value to 1 for lux level information having a lux level above 5000 lux; and setting the first probability value to a value between 0 and 1 by linearly mapping lux level information having a lux level between 3000 and 5000 lux; and calculate, based on the major colour count, a second probability value $D_{color}$ by:

$$D_{color} = \frac{1}{NormLevel} \sum_{f \in frames\ in\ time\ interval}^{n} MajorColourCount_f - BaseLevel,$$

wherein NormLevel and BaseLevel are predetermined natural numbers, MajorColourCount is the major colour count for the scene at frame f, and the time interval is a predefined time interval.

19. The data processing apparatus according to claim 18, wherein the one or more processors are further configured to:

determine a threshold driving signal by combining the first and second probability values and determine the threshold value based on the threshold driving signal; or determine one or more further probability values, wherein the one or more further probability values comprises a probability value based on presence or absence of a face in the scene, determine a threshold driving signal by combining the first, the second and the one or more further probability values, and determine the threshold value based on the threshold driving signal.

20. A non-transitory computer-readable storage medium storing a plurality of programs for execution by a computing device having one or more processors, wherein the plurality of programs, when executed by the one or more processors, cause the computing device to perform acts comprising:

receiving lux level information, AWB statistics comprising image pixel data of a frame from a sequence of frames representing a scene, and input WP information obtained from the AWB process;

generating a confidence value for the input WP information;

determining a threshold value based on a major colour count of the frame and the lux level information;

setting a binary WP update state to a locked state when the confidence value is below the threshold value and to an unlocked state when the confidence value is above the threshold value; and generating, when the binary WP update state is locked, final WP information from WP information obtained from a previous frame from said sequence and, when the binary WP update state is unlocked, generating final WP information from the input WP information.

* * * * *